(12) United States Patent
Kuhara et al.

(10) Patent No.: US 7,006,245 B1
(45) Date of Patent: Feb. 28, 2006

(54) METHOD AND APPARATUS FOR PROCESSING PHOTOGRAPHIC PRINT

(75) Inventors: Shuji Kuhara, Kanagawa (JP); Tetsuro Kanafusa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/556,459

(22) Filed: Apr. 24, 2000

(30) Foreign Application Priority Data

Apr. 23, 1999 (JP) ................................. 11-116122

(51) Int. Cl.
    *G06F 15/00* (2006.01)
(52) U.S. Cl. ..................... 358/1.9; 358/1.11; 358/1.17; 358/1.18
(58) Field of Classification Search ............... 358/1.18, 358/1.15, 1.13, 480, 318, 3.26, 3.27; 382/209, 382/260, 263, 277, 270
    See application file for complete search history.

(56) References Cited

U.S. PATENT DOCUMENTS

| | | | | |
|---|---|---|---|---|
| 5,327,248 A | * | 7/1994 | Miller et al. | ................. 382/233 |
| 5,687,297 A | * | 11/1997 | Coonan et al. | .............. 358/1.2 |
| 6,476,863 B1 | * | 11/2002 | Silverbrook | ............. 348/231.9 |

* cited by examiner

*Primary Examiner*—Twyler M. Lamb
(74) *Attorney, Agent, or Firm*—Morgan, Lewis & Bockius

(57) ABSTRACT

The method and apparatus processing photographic print represent a plurality of images arranged in a two-dimensional array on a display screen wherein images arranged at least in a one-dimensional direction in succession among the plurality of images are images processed states of which are gradually changed in at least one attribute of image proceeding and perform image verification based on the thus represented plurality of images. The method and apparatus are capable of enhancing efficiency and quality of verification by representing a plurality of images corresponding to changes of processing conditions at a time and comparing a plurality of the thus represented images with each other by an operator.

6 Claims, 2 Drawing Sheets

METHOD AND APPARATUS FOR PROCESSING PHOTOGRAPHIC PRINT

BACKGROUND OF THE INVENTION

The present invention relates to a method and an apparatus for processing a photographic print and, more particularly, to a method and an apparatus for processing a photographic print which are capable of enhancing efficiency and quality of verification by representing a plurality of images corresponding to changes of processing conditions at a time so that an operator can compare them.

In recent years, the number of so-called mini-lab shops in which photographic processing apparatus are miniaturized and automated for the purposes of prompt processing in small quantities are increasing. In photographic processing lab shops including such mini-lab shops (hereinafter referred to simply as "labs"), various ideas have been adopted so as to enhance photographic processing efficiency in such a manner that even an operator who does not have sufficient knowledge of photographic processing can operate the photographic processing apparatus.

A primal point for enhancing the photographic processing efficiency is to adjust a photographic printing condition (hereinafter referred to simply as "printing condition") so that respective original images (respective frames of negative film) for photographic printing can be processed to produce in high yield good-quality photographic prints, that is to say, photographic prints on which photographic characteristics such as density, hue, gradation and the like are reproduced in a well-balanced manner.

Such adjustment largely depends on not only performance of the photographic processing apparatus, but also skill of a so-called "verification person", namely, an operator who checks for each frame of the negative film whether a printing condition set by means of an automatic setup in the photographic processing apparatus is appropriate or not. The operator has difficulty in enhancing the skill, since it requires experience.

In order to cope with the above problem, various countermeasures have been proposed. For example, it has been known that an original image in each frame of the negative film and an image subjected to a certain type of processing (image processing), namely, an image adjusted based on a printing condition which the photographic processing apparatus has set by means of an automatic setup are displayed side by side and then such representation on a display is utilized as a reference when the operator evaluates the degree (level) of processing.

However, since a conventional apparatus of this type is constructed such that only one type of image which has been subjected to the image processing is represented by the side of the original image on a frame basis, the operator who judges that a satisfactory print quality is not still achieved must compare the images of the two frames to thereby determine and instruct an image processing condition that is deemed to be optimal.

However, this method representing only one type of processed image is not necessarily satisfactory to enhance photographic processing efficiency, because when the quality of this image is very far from that to be obtained, it is difficult to obtain a print having a satisfactory quality by one correction and, in some cases, it is necessary to repeat correction twice or three times.

SUMMARY OF THE INVENTION

The present invention has been accomplished under these circumstances and in order to solve the above problems inherent in prior art, an object of the invention is to provide a method for processing a photographic print that is capable of enhancing efficiency and quality of verification by representing a plurality of images corresponding to changes of processing conditions at a time so that an operator can compare them.

Another object of the invention is to provide an apparatus for processing the photographic print for implementing the above method.

In order to achieve the object described above, the present invention provides a photographic print processing method, comprising the steps of representing a plurality of images arranged in a two-dimensional array on a display screen wherein images arranged at least in a one-dimensional direction in succession among the plurality of images are images processed states of which are gradually changed in at least one attribute of image proceeding and performing image verification based on the thus represented plurality of images.

The phrase "processed state" in the present invention means a state in which an image is processed with a preset magnitude (value) of a parameter of an image processing attribute (hereinafter also referred to simply as "attribute").

The phrase "processed states are changed", as will be described in an embodiment in detail later, means a step that a parameter of a designated attribute is changed into a plurality of levels and states of the processed images are changed in accordance with such changes of parameter levels.

In the method, it is preferred that the at least one attribute has a plurality of attributes of the image processing, and wherein the plurality of images represented in the two-dimensional array are arranged in each one-dimensional direction in respect to two attributes selected arbitrarily from the plurality of attributes.

In order to achieve the another object described above, the present invention provides a photographic print processing apparatus, comprising a device for reading an image recorded on film and a representation device for representing the thus read image wherein images processed states of which are gradually changed in at least one attribute of image processing and which are arranged at least in a one-dimensional direction are represented in succession on a screen of the representation device.

In the apparatus, it is also preferred that the at least one attribute has a plurality of attributes of the image processing, and wherein the plurality of images represented in the two-dimensional array are arranged in each one-dimensional direction in respect to two attributes selected arbitrarily from the plurality of attributes.

Alternatively, in the present invention, a plurality of images the processed states of which are gradually chanced in arbitrary two attributes among a plurality of attributes are represented in two-dimensional array in respect to the arbitrary two attributes.

DETAILED DESCRIPTION OF THE INVENTION

The method and apparatus for processing a photographic print of the present invention are now described in detail below with reference to the preferred embodiment shown in the accompanying drawings.

Figure 1:
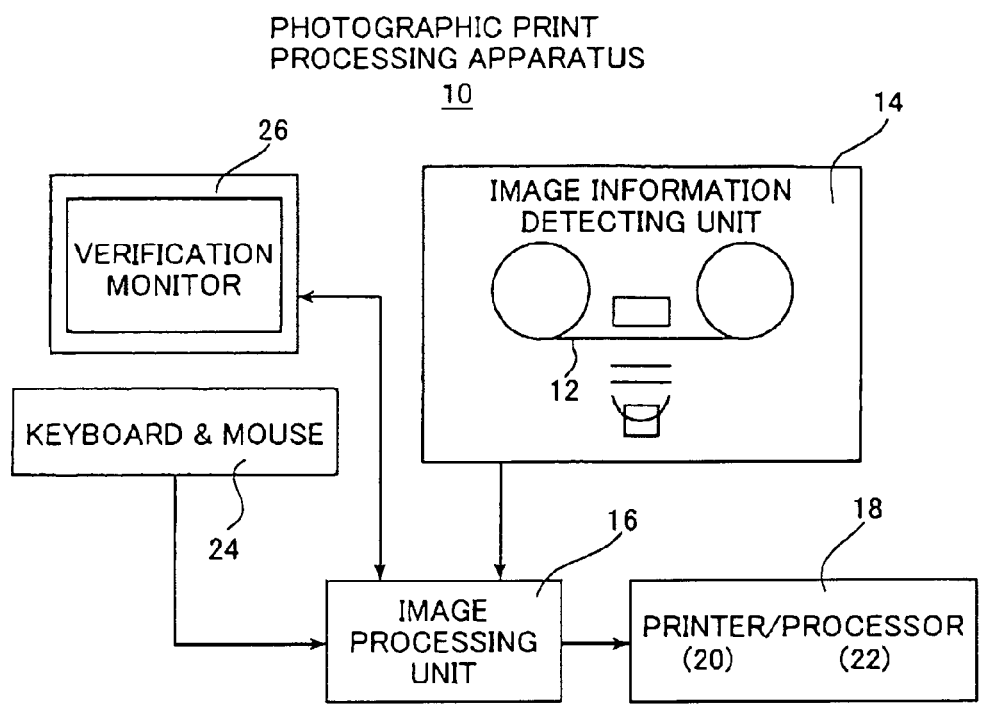
FIG. 1 is a block diagram showing a schematic structure of a photographic print processing apparatus according to an embodiment of the present invention.

FIG. 1 is a block diagram showing a schematic structure of a photographic print processing apparatus 10 according to an embodiment of the present invention. In FIG. 1, a reference numeral 14 denotes an image information detecting unit (hereinafter referred to simply as "information detecting unit) which photoelectrically reads image information of a negative film 12; and a reference numeral 16 denotes an image processing unit which subjects image data read by the information detecting unit 14 to a predetermined image processing operation to produce output image data.

A reference numeral 18 denotes an output device which comprises a printer 20 that records a latent image by scan-exposing a light-sensitive material (photographic paper) with light beams modulated in accordance with image data outputted from the above-described image processing unit 16 and a processor 22 that performs wet development and drying processing on the thus exposed light-sensitive material to produce a finished print.

Connected to the above-described image processing unit 16 are a keyboard together with a mouse 24 for inputting or setting various conditions, selecting and commanding a specific processing step and entering a command and so forth for effecting color/density correction, as well as a display (monitor for verification) 26 for representing the image captured with the information detecting unit 14, various manipulative commands and screens for setting and registering various conditions.

The information detecting unit 14 reads the image by slit scan-exposing. Namely, the negative film 12 having a plurality of frames in which images are recorded is illuminated with a reading light while it is transported (in an auxiliary scanning direction) by a transport roller pair provided on opposite sides of a predetermined reading position as it is held in registry with the reading position with a carrier not shown. In such a way, the images of the film are read by scanning with the reading light two-dimensionally.

When the image is read in the information detecting unit 14, the image in one frame is ordinarily captured by two scans, the first being prescan at low resolution for determining an image processing condition and the second being fine scan for obtaining output image data.

Conventionally, when the negative film 12 is to be verified, the image processing condition of each prescanned frame is set frame by frame in succession and is used to perform image processing to obtain prescanned images, which are represented on the display 26 as simulated images for each predetermined number of frames to be verified.

When verification of the predetermined frames of the negative film 12 is finished, the negative film 12 is transported in the reverse direction or rewound to the position of the first prescanned frame (first frame) where fine scan is then performed. When rewinding of the film is finished, fine scan starts from the first frame. When a plurality of pieces of negative film are to be reprinted, this operation is performed by supplying them in succession.

In the embodiment under consideration however, when representing images for verification on the display 26, in respect of two attributes such as sharpness enhancement and gradation adjustment among a plurality of image processing attributes (steps) that are to be performed on one image frame, a plurality of images in which the processing conditions to be processed are changed little by little are produced by changing the magnitudes (values) of the respective parameters of two attributes into levels, for example, four levels. The thus produced different images are represented on one screen (verification screen).

Figure 2:
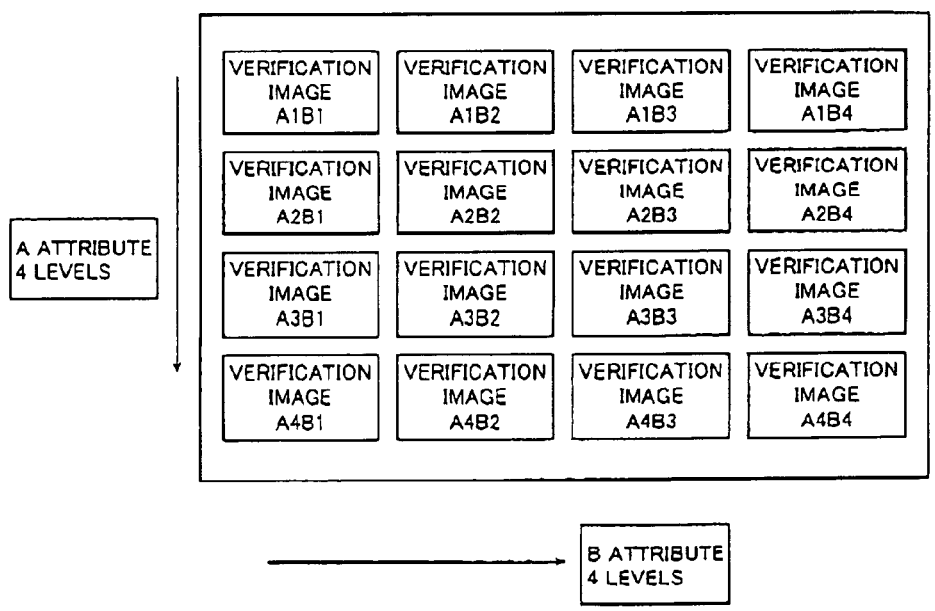
FIG. 2 shows a concept of verification picture represented on a display (monitor for verification) in the photographic print processing apparatus shown in FIG. 1.

FIG. 2 schematically shows an exemplary illustration of a verification screen 30. The example in FIG. 2 shows in total 16 frame images produced under the respective processing conditions of the two attributes A and B each of which has been changed to have four level magnitudes (values) of correction parameters.

Four in ith row images denoted by verification image AiB1"—"verification image AiB4" (where "i" represents 1–4) are images produced by changing the attribute B into four levels, whereas four images in jth row denoted by "verification image A1Bj"—"verification image A4Bj" (where "j" represents 1–4) are images produced by chancing the attribute A into four levels.

If the verification screen as shown in FIG. 2 is used, the operator can compare the 16 images displayed on the display screen with each other and select the most favorable image to thereby set appropriate parameter values for up to two attributes at a time.

Figure 3:
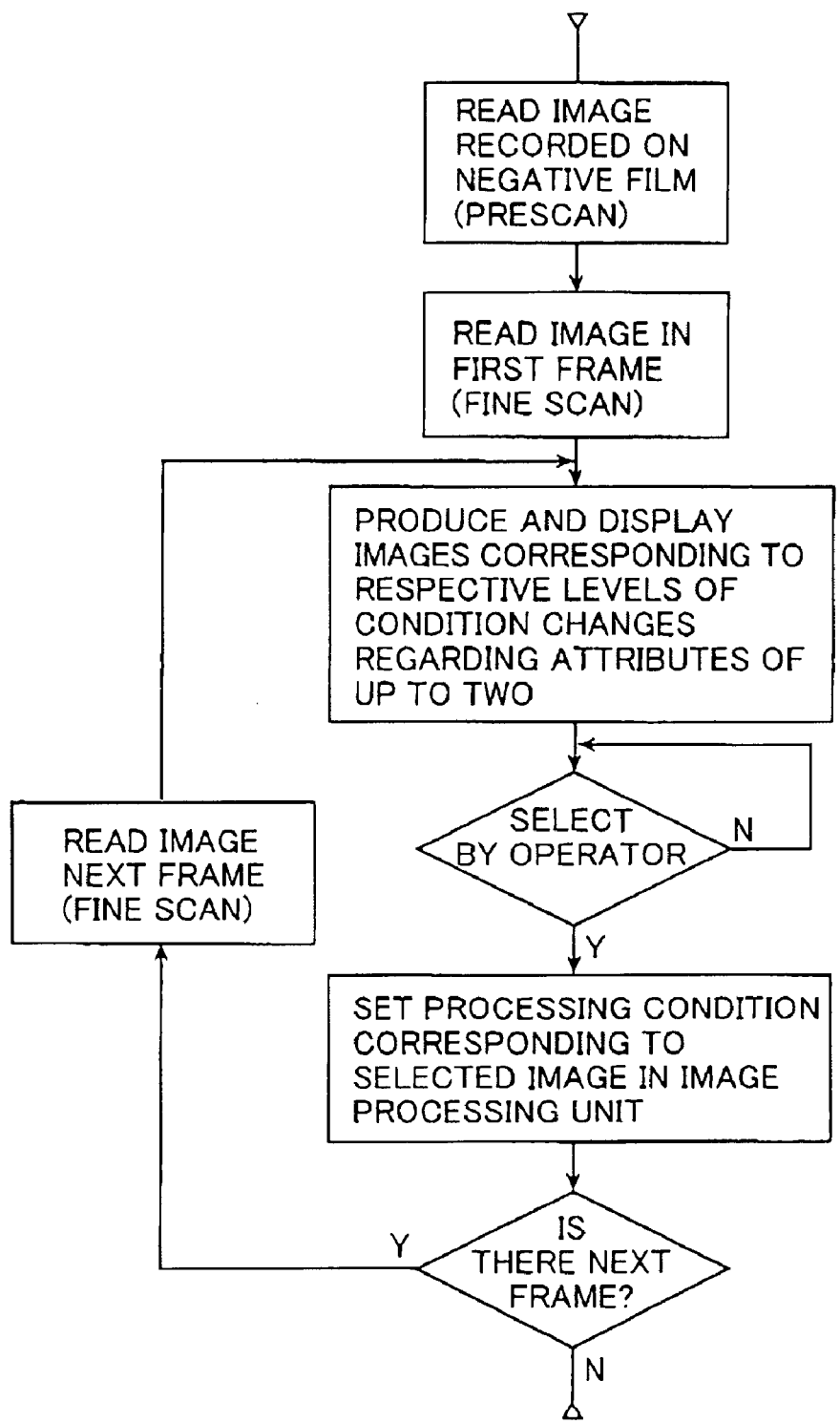
FIG. 3 is a flowchart explaining operations in the photographic print processing apparatus shown in FIG. 1

Now, the operation of the photographic print processing apparatus 10 according to the present embodiment will be described with reference to a flowchart shown in FIG. 3.

The operator who operates the photographic print processing apparatus 10 according to the present embodiment sets a negative film 12 to be employed for producing a print therefrom in the photographic print processing apparatus 10 and then presses a start button. In the information detecting unit 14 of the photographic print processing apparatus 10, a reading condition of the negative film 12 is determined by prescan; then, based on the thus determined reading condition, a first frame of the negative film 12 is read by fine scan; and image data obtained from the thus read image information is sent to the image processing unit 16.

In the image processing unit 16, when necessary image processing including some attributes (steps) is performed on the image data of the frame of interest sent from the information detecting unit 14, a parameter value for an image processing attribute which is considered to be appropriate is selected and then changed into four levels thereabout, namely, four level values between an upper side and a lower side of the selected parameter; and four processed images are produced using the thus produced four level values of the parameter and represented on the display 26. When the number of the (image processing) attributes is specified as two, 16 (4×4) processed images are represented.

The operator compares the above-described 16 processed images thus represented on the display screen with each other to select the most favorable image, whereupon the respective favorable parameter values of the above-described two attributes are instructed to the image processing unit 16 and image processing conditions or a part thereof are determined. If there is any other (image processing) attribute the parameter value of which is to be determined, the operator determines the parameter value of the additional attribute by displaying images in a similar way as described above.

When the processing condition such as the image processing condition of one frame can be determined, image data of a next frame is read; and then, based on the thus read image data, a processing condition is determined in a similar way as described above. After processing conditions of all frames in one negative film 12 are determined, a next negative film 12 is processed in succession.

According to the above embodiment, the operator can determine a processing condition for producing a favorably finished photographic print without any complicated judgment, by such a simple operation that the most favorable image is selected, for each frame of the negative film 12, from among many images produced by changing each of parameters of a plurality of attributes into four level values (magnitudes). Such photographic print finished favorably can be produced based on the thus determined processing condition.

In the above embodiment, for the sake of simplification, an example of characteristic operation of the present invention which is to represent many images produced by changing each of the parameters of a plurality of attributes into multiple levels is described; however, the present invention is by no means limited to the above embodiment.

For example, in the above embodiment, for the sake of simplification, it has been explained that all frames of the negative film 12 are first read (prescanned); then, after the reading conditions of fine scan are determined, the fine scan is performed frame by frame. However, all frames of the negative film 12 may be read also in fine scan and the thus read image data of all frames may be stored to be read out afterward in succession.

Another embodiment is also possible: the operator ordinarily displays images of a plurality of frames in a unit of six frames as images processed under the respective conditions that are considered to be most favorite and performs a verification operation based on the displayed images and, only when desired, for example, when the operator finds it difficult to make judgement on a picture pattern or the like, the operator selects the screen for the multi-level processing to determine the processing conditions in a careful manner.

The processing conditions are not limited to the image processing conditions mentioned in the above-described embodiments, but a correction of various types of aberration derived from a taking lens can be also included. Of course, the processed image can be produced by various combinations of these processing conditions. This is also an effective way.

In another case, the present invention is also an effective technique when two images are combined to produce one composite image, for example, in producing a greeting card incorporated with a photograph, as an application of the image processing. In this case, samples of various combinations (selections, overlapping and so forth) of two images are prepared and then the most favorable one is selected. If an apparatus capable of performing such operations is installed at a place near the entrance of a lab shop (laboratory), a customer can directly operate it.

Consequently, the method and apparatus of the photographic print processing according to the present invention are capable of instructing the processing condition for obtaining the photographic print of the most favorable quality by a simple operation that a plurality of images which have been produced by changing as required the parameter value of at least one attribute are represented and then the most favorable image is selected.

As previously described, the processing condition or the like to be applied is not limited in any particular way, but widely available. Of course, the number of levels of the processing condition to be determined for each attribute can freely be determined.

As described above in detail, according to the present invention, the method and apparatus of photographic print processing capable of enhancing the efficiency and quality of verification can be achieved by representing a plurality of images corresponding to changes of processing conditions at a time so that the operator can compare them.

What is claimed is:

1. A photographic print processing method, comprising the steps of:
   displaying a plurality of images arranged in a two-dimensional array on a display screen wherein images arranged at least in a one-dimensional direction in succession among said plurality of images are images processed states of which are gradually changed in at least one attribute of image processing; and
   performing image verification based on the thus displayed plurality of images.

2. The method according to claim 1,
   wherein said at least one attribute has a plurality of attributes of the image processing, and
   wherein said plurality of images displayed in the two-dimensional array are arranged in each one-dimensional direction in respect to two attributes selected arbitrarily from the plurality of attributes.

3. A photographic print processing apparatus, comprising:
   a device for reading an image recorded on photographic film; and
   a display device for displaying the thus read image,
   wherein image processed states of which are gradually changed in at least one attribute of image processing and which are arranged at least in a one-dimensional direction are displayed in succession on a display screen of the display device.

4. The apparatus according to claim 3, wherein said at least one attribute has a plurality of attributes of the image processing, and wherein said plurality of images displayed in the two-dimensional array are arranged in each one-dimensional direction in respect to two attributes selected arbitrarily from the plurality of attributes.

5. A photographic print processing method, comprising the steps of displaying a plurality of images arranged in a two-dimensional array on a display screen wherein said plurality of images are processed in one frame in different states to each other and arranged at least in a one-dimensional direction in succession are images processed states which are gradually changed in at least one attribute of image proceeding; and performing image verification of said image in said one frame based on the thus displayed plurality of images.

6. A photographic print processing apparatus, comprising:

a device for reading an image recorded on photographic film; and a display device for displaying the thus read image, wherein a plurality of images which are processed said read image in one frame in different states to each other are arranged in a two-dimensional array on a display screen of the display device, and wherein images processed states of which are gradually changed in at least one attribute of image processing and which are arranged at least in a one-dimensional direction are displayed in succession on the display screen of the display.

* * * * *